(12) United States Patent
Strong et al.

(10) Patent No.: US 12,153,609 B2
(45) Date of Patent: Nov. 26, 2024

(54) SYSTEMS AND METHODS FOR UTILIZING PROPERTY FEATURES FROM IMAGES

(71) Applicant: Eagle View Technologies, Inc., Rochester, NY (US)

(72) Inventors: Shadrian Strong, Bellevue, WA (US); Lars Dyrud, Crownsville, MD (US); David Murr, Minneapolis, MN (US)

(73) Assignee: Eagle View Technologies, Inc., Rochester, NY (US)

( * ) Notice: Subject to any disclaimer, the term of this patent is extended or adjusted under 35 U.S.C. 154(b) by 0 days.

(21) Appl. No.: 18/480,811

(22) Filed: Oct. 4, 2023

(65) Prior Publication Data

US 2024/0028623 A1 Jan. 25, 2024

Related U.S. Application Data

(63) Continuation of application No. 17/813,091, filed on Jul. 18, 2022, now Pat. No. 11,782,959, which is a (Continued)

(51) Int. Cl.
| | |
|---|---|
| *G06Q 50/16* | (2024.01) |
| *G06F 16/29* | (2019.01) |
| *G06F 16/583* | (2019.01) |
| *G06N 3/02* | (2006.01) |
| *G06N 3/04* | (2023.01) |
| *G06V 20/10* | (2022.01) |

(52) U.S. Cl.
CPC ......... *G06F 16/29* (2019.01); *G06F 16/5838* (2019.01); *G06F 16/5862* (2019.01); *G06N 3/02* (2013.01); *G06N 3/04* (2013.01); *G06Q 50/16* (2013.01); *G06V 20/176* (2022.01)

(58) Field of Classification Search
None
See application file for complete search history.

(56) References Cited

U.S. PATENT DOCUMENTS

| 5,793,888 A | 8/1998 | Delanoy |
| 6,504,571 B1 | 1/2003 | Narayanaswami et al. |
| (Continued) | | |

FOREIGN PATENT DOCUMENTS

| GB | 2554361 A | 4/2018 |
| WO | WO 2016/054694 | 4/2016 |

OTHER PUBLICATIONS

Huang and Jensen, "A Machine-Learning Approach . . . with GIS Data," PE&RS, Oct. 1997, available at: < https://www.asprs.org/wp-content/uploads/pers/1997journal/oct/1997_oct_1185-1194.pdf > pp. 1185-1194. (Year: 1997).*

(Continued)

*Primary Examiner* — Richard W. Crandall
(74) *Attorney, Agent, or Firm* — DUNLAP CODDING, P.C.

(57) ABSTRACT

A process for locating real estate parcels for a user comprises accessing a library of parceled real estate image data to identify objects and features in a plurality of parcels identified by the user as having a feature of interest. A predictive model is constructed and applied to a geographic region selected by the user to generate a customized output of real estate parcels predicted to have the feature of interest, or, in some implementations, not to have the feature of interest.

20 Claims, 6 Drawing Sheets

Related U.S. Application Data continuation of application No. 15/634,879, filed on Jun. 27, 2017, now Pat. No. 11,392,625.

(60) Provisional application No. 62/354,873, filed on Jun. 27, 2016.

(56) References Cited

U.S. PATENT DOCUMENTS

| | | | |
|---|---|---|---|
| 7,424,133 | B2 | 9/2008 | Schultz et al. |
| 8,095,434 | B1 | 1/2012 | Puttick et al. |
| 8,462,992 | B2 | 6/2013 | Chen et al. |
| 9,082,162 | B2 | 7/2015 | Gokturk et al. |
| 9,424,305 | B1 | 8/2016 | Puttick |
| 9,536,148 | B2 | 1/2017 | Gross |
| 9,805,261 | B1 | 10/2017 | Loveland et al. |
| 10,977,490 | B1 | 4/2021 | Bokshi-Drotar et al. |
| 2009/0067725 | A1 | 3/2009 | Sasakawa et al. |
| 2012/0323798 | A1 | 12/2012 | Den Herder et al. |
| 2013/0046746 | A1 | 2/2013 | Bennett |
| 2013/0155109 | A1 | 6/2013 | Schultz et al. |
| 2015/0213315 | A1 | 7/2015 | Gross |
| 2015/0227808 | A1 | 8/2015 | Zharkov |
| 2015/0347872 | A1 | 12/2015 | Taylor et al. |
| 2016/0196747 | A1 | 7/2016 | Tsyrklevich et al. |
| 2016/0239956 | A1 | 8/2016 | Kang et al. |
| 2016/0259994 | A1 | 9/2016 | Ravindran et al. |
| 2017/0091627 | A1* | 3/2017 | Terrazas ............... G06N 20/00 |
| 2018/0089531 | A1 | 3/2018 | Geva et al. |
| 2018/0089833 | A1 | 3/2018 | Lewis et al. |
| 2019/0065907 | A1 | 2/2019 | Strong et al. |
| 2019/0155973 | A1 | 5/2019 | Morczinek et al. |
| 2019/0271550 | A1 | 9/2019 | Breed et al. |
| 2020/0019825 | A1 | 1/2020 | Frei et al. |
| 2020/0348132 | A1 | 11/2020 | Du et al. |
| 2021/0158609 | A1 | 5/2021 | Raskob et al. |

OTHER PUBLICATIONS

OmniEarth, Inc., Response to Jul. 18, 2023 Office Action regarding Canadian Patent Application No. 3,020,282, Dated Nov. 16, 2023.
PCT International Search Report and Written Opinion regarding PCT Patent App. No. PCT/US17/39567 mailed Sep. 28, 2017.
"OmniParcels for Insurance", PowerPoint Presentation, OmniEarth, Inc., Mar. 25, 2016.
"OmniParcels National Building Footprint Database", OmniEarth, Inc., 2017.
"OmniParcels/Yardographics/Water Resources", OmniEarth, Inc., retrieved from the internet: https://parceldemo.omniearth.net/#/map/, Feb. 2016.
"OmniParcels Delivers Current, Searchable Property Attributes with Regular Updates", via Internet Archive Wayback Machine [retrieved from the internet Jul. 25, 2017] retrieved from: https://web.archive.org/web/20160305114343/http://omniparcels.omniearth.net/, Mar. 5, 2016.
Goldberg et al., "Extracting geographic features from the Internet to automatically build detailed regional gazetteers," International Journal of Geographical Information Science, 23:1, 93-128, Jan. 2009.
Harris Geospatial Solutions, "Using ENVI and Geographic Information Systems (GIS)", Jan. 31, 2013.
Commonwealth of Massachusetts Executive Office of Environmental Affairs, "Parcel Mapping Using GIS a Guide to Digital Parcel Map Development for Massachusetts Local Governments", Aug. 1999.
European Court of Auditors, "The Land Parcel Identification System: a useful tool to determine the eligibility of agricultural land—but its management could be further improved", Luxembourg, 2016.
Nielsen, Michael A., "Neural Networks and Deep Learning" Determination Press, 2015, updated Jan. 19, 2017.
European Patent Office, Extended European Search Report regarding European Patent Application No. 17821099.3, Dec. 5, 2019.
OmniEarth, Inc., Response to Dec. 5, 2019 Extended European Search Report regarding European Patent Application No. 17821099.3, Jul. 7, 2020.
Galarreta et al., "UAV-based Urban Structural Damage Assessment Using Object-based Image Analysis and Semantic Reasoning," Nat. Hazards Earth Syst. Sci., 15, 1087-1101; Copernicus Publications; 2015.
Galarreta, Jorge Fernandez; "Urban Structural Damage Assessment Using Object-Oriented Analysis and Semantic Reasoning," Thesis submitted to the Faculty of Geo-Information Science and Earth Observation of the University of Twente; Enschede, the Netherlands, Apr. 2014.
Kang et al., "Building Instance Classification Using Street View Images," ISPRS Journal of Photogrammetry and Remote Sensing, 145, 44-59, Elsevier, Mar. 2018.
Intellectual Property India, Examination Report regarding Indian Patent Application No. 201817045806, Dated Jun. 30, 2021.
Australian Government IP Australia, Examination Report No. 1 for Australian Patent Application No. 2017289948, dated Dec. 9, 2021.
OmniEarth, Inc., Response to Jun. 30, 2021 Examination Report regarding India Patent Application No. 201817045806, dated Dec. 21, 2021.
Canadian Intellectual Property Office, Office Action regarding Canadian Patent Application No. 3,020,282, Dated Jul. 18, 2023.
Li et al., "Object-Based Land-Cover Mapping with High Resolution Aerial Photography at a County Scale in Midwestern USA," Remote Sensing, 2014, 6, 11372-11390; doi:10.3390/rs61111372.

* cited by examiner

SYSTEMS AND METHODS FOR UTILIZING PROPERTY FEATURES FROM IMAGES

CROSS-REFERENCE TO RELATED APPLICATIONS

The present patent application claims priority and is a continuation of U.S. Ser. No. 17/813,091, filed Jul. 18, 2022, which claims priority to and is a continuation of U.S. Ser. No. 15/634,879, filed Jun. 27, 2017, entitled "Systems and Methods for Utilizing Property Features from Images," which issued as U.S. Pat. No. 11,392,625 on Jul. 19, 2022, which claims priority to the provisional patent application identified by U.S. Ser. No. 62/354,873, filed on Jun. 27, 2016, entitled "System and Method for Machine Learning Based Extraction of Property Information," the entire contents of each of which are hereby incorporated herein by reference.

BACKGROUND

Online real estate marketing tools and computer software applications are increasingly being used to improve and speed the real estate selection process. For example, mobile applications (apps) can provide users with images, interactive maps, and value estimates for homes in the provider's database. Other online apps assist users in finding neighborhoods and houses that match the user's search criteria or location needs.

Most potential buyers start their home search using one or more online real estate databases. It is common for web sites to display individual data points in connection with a geographic map. For example, many real estate web sites permit their users to display a map of a particular geographic region that shows the location of every home that is currently for sale. A user may click on one of these homes to obtain detailed information about the home. Similarly, some property tax jurisdictions make available web sites that show each property tax parcel on a map; a user may click on one of the parcels to see detailed information about it. See, for example, U.S. Pat. No. 8,095,434.

It is common for users to query a database by submitting a query that specifies values of one or more fields present in the database, and receive in return a result listing records in the database that contain the specified values in the specified fields. Queries conventionally include geographic data and relational data. Relational database fields are typically limited to attributes such as price, number of bedrooms, number of bathrooms, square feet, and the like. In some cases, the queries also include text data. A query that specifies attributes of multiple types, sometimes called a "hybrid query," can be first processed against an index appropriate to each attribute type resulting in multiple intermediate query results. In order to obtain a final query result from the intermediate query results, the intermediate query results are joined, or "intersected," so that the final query result contains only data items present in each of the intermediate query results. See, for example, U.S. Pat. No. 9,424,305 describing methods to increase the processing efficiency for a conventional hybrid query.

FIG. 1 is a data flow diagram showing a conventional process for responding to a hybrid query. A relational Index A provides information such as price, square feet, lot size, and the like. Index B contains geographic information and Index C contains descriptive terms provided by the seller. The normalized query results from each index are intersected to provide a final query result. FIG. 2 is another example flow chart of this conventional process.

Unfortunately, to maintain each index, the information must be entered at least once by hand. This limits the amount of information that can ultimately be searched. While some online real estate databases are quite large, users must still often search multiple databases to find properties with the desired characteristics. Often the desired characteristic is not apparent or searchable, making even a digital search quite time consuming. In addition, qualitative information such as the look and feel of the real estate is difficult to properly index, particularly since the provider of this information may have significantly different views relative to the user. Accordingly, approaches to creating and using indices that can take into account qualitative information based on machine learning rather than manual input would have significant utility.

SUMMARY

A process for locating real estate parcels for a user comprises accessing a library of image and other supplemental data that may be parceled by real estate/ownership boundaries to identify objects and features that may be externally discernable or shared in a plurality of parcels identified by the user as having a feature or characteristic of interest. A predictive model of the desired object and features is constructed and applied to a geographic region selected by the user to generate a customized output of real estate parcels predicted to have the feature of interest.

In one embodiment, one or more non-transitory computer readable medium store a set of computer executable instructions for running on one or more computer systems that when executed cause the one or more computer systems to access a library of parceled real estate data including object and feature identifications and classifications that may be discernable through imagery alone or based on geospatially combining imagery data with parcel-level or other regional information (not necessarily discernable within the imagery, e.g. school districts, HVAC details, tax information), to identify and classify objects and features present in one or more real estate parcel(s) selected by a user as having a feature of interest, and develop and apply a predictive model to a geographic region selected by the user to identify real estate parcels predicted to have the same feature of interest. Artificial neural network machine learning algorithms can be used to develop the predictive model and the object and feature identifications and classifications by analyzing images taken from one or more orientations or distances from the real estate parcels (e.g., street view images, satellite and/or aerial images) showing the objects and features. The imagery may be fused with supplemental parcel information (e.g., number of stories, heating/cooling systems, livable space, number of rooms) to further enhance predictive capabilities through the artificial neural network machine learning technology. Thus, the limitations of the prior art that do not take into account the look and feel of the real estate parcels when identifying candidate real estate parcels are overcome.

BRIEF DESCRIPTION OF SEVERAL VIEWS OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

DETAILED DESCRIPTION

Figure 1:
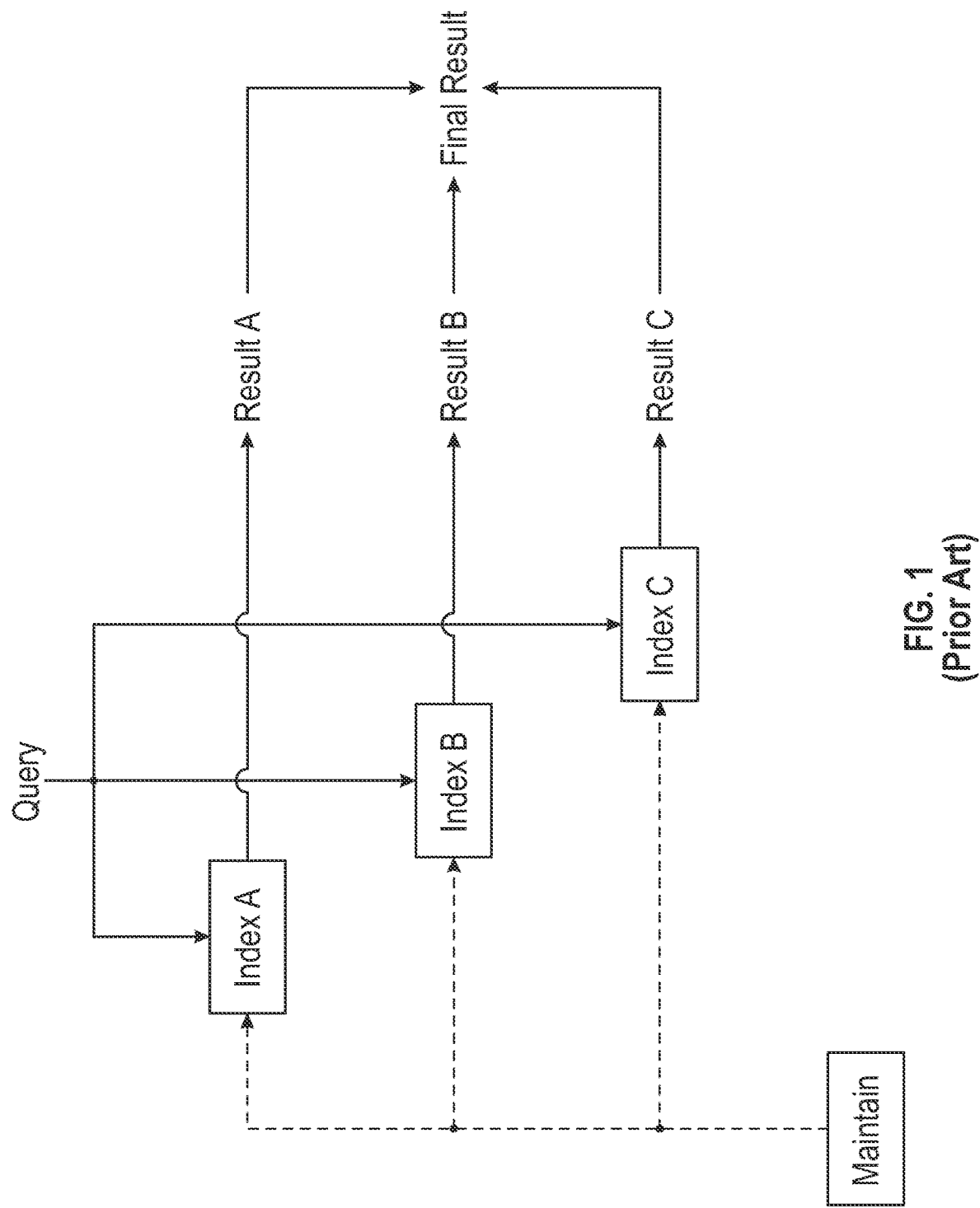
FIG. 1 is a data flow diagram for maintaining and querying a conventional real estate database system.
Figure 2:
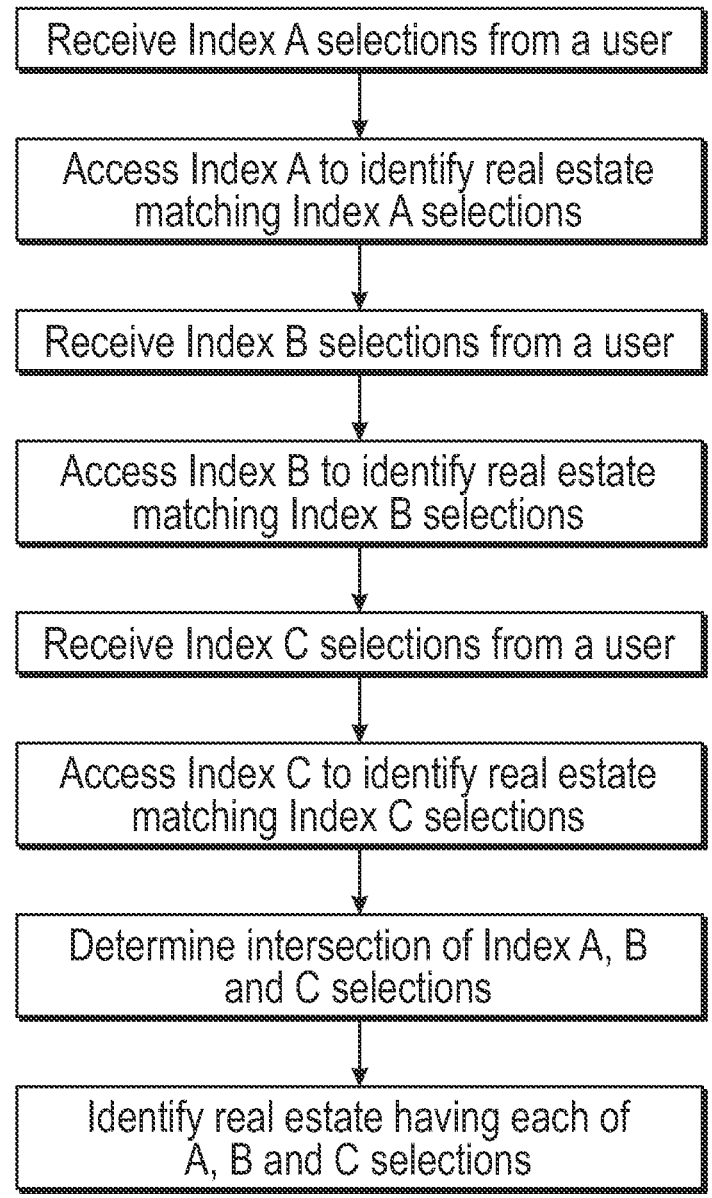
FIG. 2 is a flow chart of the conventional online real estate selection process of FIG. 1.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. For example, although the real estate shopping market may be used as an example, feature extraction in one or more images in other industries, such as insurance, roofing, and construction is contemplated. Additionally, identification of features absent within one or more images is also contemplated. Also, it is to be understood that the phraseology and terminology employed herein is for purposes of description, and should not be regarded as limiting.

The following detailed description refers to the accompanying drawings. The same reference numbers in different drawings may identify the same or similar elements.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, any reference to "one embodiment," "an embodiment," "some embodiments," "one example," "for example," or "an example" means that a particular element, feature, structure or characteristic described in connection with the embodiment is included in at least one embodiment. The appearance of the phrase "in some embodiments" or "one example" in various places in the specification is not necessarily all referring to the same embodiment, for example.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), field programmable gate array (FPGA), a combination of hardware and software, and/or the like. The term "processor" as used herein means a single processor or multiple processors working independently or together to collectively perform a task.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, optically based, and/or the like.

Figure 3:
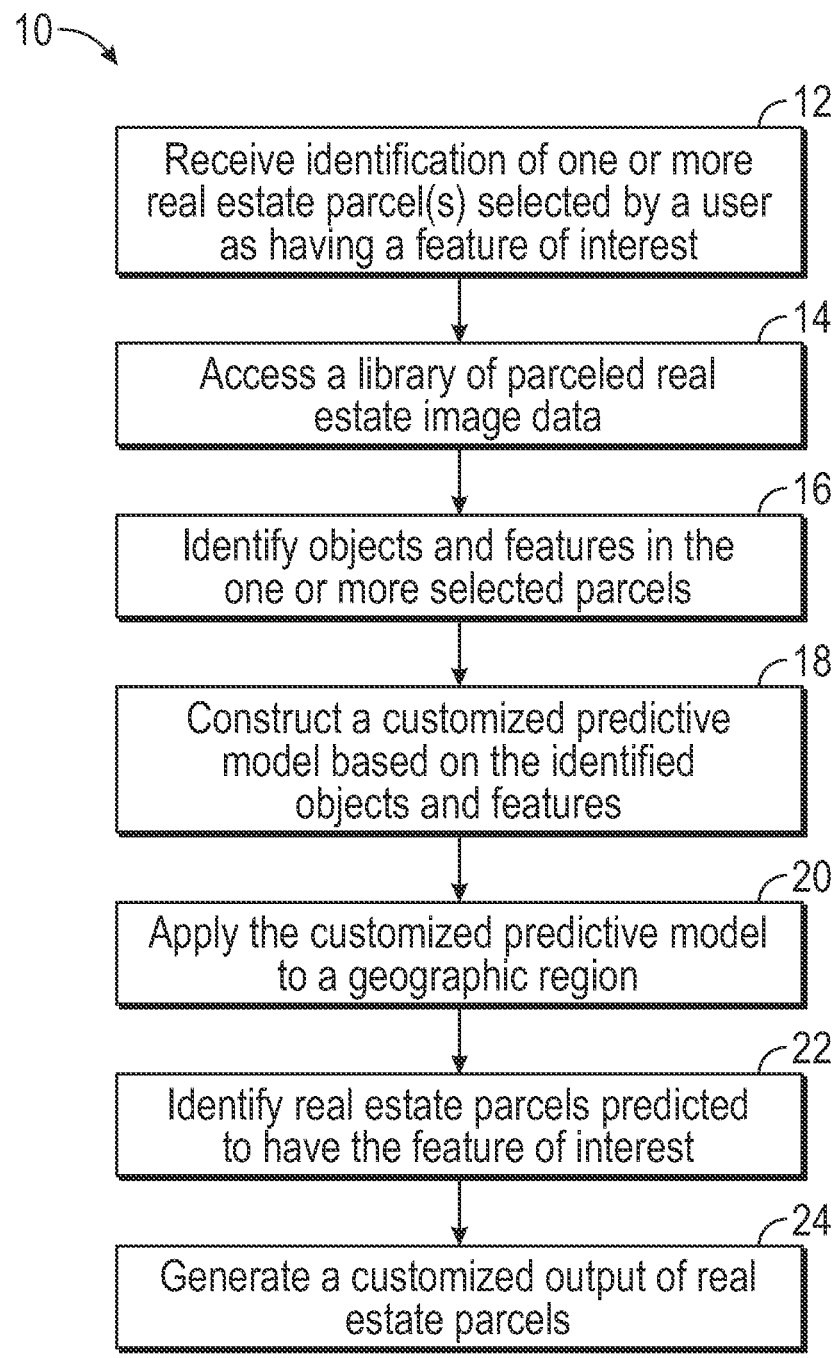
FIG. 3 is a flow chart for an example process for locating candidate real estate parcels for a user in accordance with the present disclosure.

Referring now to FIG. 3, shown therein is a flow chart 10 of an exemplary process for automatically locating real estate parcels for a user. In step 12, information is received from a user regarding one or more specific address(es) or real estate parcel(s) having a feature of interest to the user. A library of parceled real estate image and other supplemental data is accessed in step 14 and the objects and features bounded by the parcel are identified in step 16. Based on the identified objects and features in the parcel(s) selected by the user, a customized predictive model is constructed in step 20. The customized predictive model is applied to a geographic region in step 22 to identify additional real estate parcels predicted to have the feature of interest. In step 24 a customized output of the identified real estate parcels is generated.

The library of parceled real estate data is not limited to externally visible or discernable objects and features. There can also be other property attributes that pertain to the parcel (supplemental data), such as number of stories, heating system, etc., that are not visible but can still be tied to the property and aggregated with the imagery data.

Exemplary goals of the presently-disclosed inventive concepts are to (1) provide robust deep-learning/machine-learning classifiers for parcel level trending on-the-fly, based on a set of user-supplied locations via an interface, such as a web-like interface or a smartphone interface; (2) apply classifiers to imagery and supplemental data of a desired region of interest, such as a town, a municipality, a metro area, a state, a nation, or worldwide, to create predictive feature models; and (3) provide the user suggestions, profiling, and information based on application of the predictive feature models to larger regions of interest set by the user.

In an exemplary embodiment, the user supplies "crowd-sourced" information to aid in predictive model generation. Identified properties having features of interest are utilized to build deep-learning/machine-learning custom classifiers or models on a small subset of data that are then deployed to a larger region. Crowd-sourced information can be part of the supplemental information such as nearby running trails, coffee shops, neighborhood related details, public transit, quality of school district, etc. The crowd-sourced data can include anything that can be geospatially associated with a property address.

Large-scale deployment facilitates identification of parcels or locations with similar characteristics to those originally selected by the user.

In one embodiment, the information regarding the real estate parcels of interest is uploaded by the user from a computer. The term "computer" includes a personal computer, a smart phone, a network-capable TV set, a TV set-top box, a tablet, an e-book reader, a laptop computer, a desktop computer, a network-capable handheld device, a video game console, and the like.

There exist various nationwide and to some degree globally recognized property ownership boundaries. These boundaries go through a quality assurance (QA) process and are typically provided by large companies like Pitney Bowes Inc. and CoreLogic, Inc. These boundaries are often gathered from county- or city-level surveys and compiled/aggregated by these companies. The boundaries are then used to intersect the imagery/property information in a geospatial (latitude/longitude) context.

The user can merely like the look and feel of a particular real estate parcel, or the user may be interested in specific objects, features or combinations thereof in a particular parcel. Examples of the look of the particular real estate parcel may include the style of the property, e.g., art deco, bungalow, cape cod, colonial, contemporary, craftsman, Dutch colonial, federal, French provincial, Georgian, gothic revival, Greek revival, prairie, pueblo, Queen Anne, ranch, regency, saltbox, second empire, shed, shingle, shotgun, Spanish eclectic, split level, stick, Tudor and Victorian. Examples of the look of the particular real estate parcel may include an arrangement or the relative size of objects on the property. The term "feel" as used herein means an emotion (e.g., love, hate) or sensation (excitement, loathing) induced by viewing the real estate parcel or one or more images showing the real estate parcel. In either case, using a computer, the user identifies the one or more parcels by physical address, or the user can identify the parcels of interest from a map. For example, the user may be provided a parceled map with satellite images of the properties and allowed to view the satellite images of the properties and select one or more parcels of interest by, for example, clicking on region(s) of the satellite images showing the one or more parcels of interest.

The library of parceled real estate image and supplemental data accessed in step 14 can be created using remote sensing technologies that collect, process and store image data in a database. The image data can be captured with a sensor (e.g., a camera). The sensor can be oriented and located in various orientations, such as streetview, satellite and/or aircraft-based sensors and may contain nominal 'visible-band' (red, green, blue) data or other spectral bands (e.g., infrared). Such sensors can provide images which can then be used to detect and measure objects and structures within the images. The remote sensing technologies may also include a monitoring system (e.g., a Global Positioning System and/or Inertial Measurement Unit) that collects and logs geolocation metadata that relates the sensor data (e.g., images) to particular locations on the Earth. See, for example, U.S. Pat. No. 7,424,133 that describes techniques for geolocating oblique images and measuring within the oblique images. The entire content of U.S. Pat. No. 7,424,133 is hereby incorporated herein by reference. Also, see U.S. Publication No. 2015/0347872 describing object detection from aerial images using disparity mapping and segmentation techniques. Techniques known in the art as "bundle adjustment" can also be used to create and/or enhance the geolocation data. The geolocation data can be stored as metadata within the images, or stored separately from the images and related to the images using any suitable technique, such as unique identifiers.

The parcel boundaries can be derived from GIS (geographic information system) coordinates of a piece of property. In the United States, legal property boundaries are specified on deeds and subdivision maps which are recorded at the recorder's office for the jurisdiction in which the land lies and are public information. Local tax assessors use the recorded documents to maintain tax maps. Tax assessor maps, often available from the assessors' websites, have parcel information that is indexed by address and provided a unique assessor parcel number (APN) or equivalent. These maps are public information, often in a GIS format such as shapefiles or geojsons. Shapefiles and the like could be visualized as a "cookie cutter" because indicia indicative of the parcel boundary(ies) can be placed on top of the image (e.g., overlaid) or set of images through geolocation and the image data (pixel data and spectral band information) may be clipped to these boundaries (like using a cookie cutter). In one embodiment, the image pixels within a particular parcel boundary can be analyzed without clipping the image data to the parcel boundary(ies). Then one can know which pixels in the image pertain to which parcel region. The "cookie cutter" can stamp out any number of images from any date, time, or sensor assuming the image has been geolocated, i.e., made into latitude/longitude points so that each pixel corresponds to a point on the earth.

Images comprise unstructured data. Despite the fact that the image may be georeferenced, the information in the pixels of the image are not catalogued or ordered in a way to provide contextual or searchable meaning until objects and features, etc. are associated with groups of pixels and tagged with a property/geolocation.

Physical information includes the general location of objects and features in the property. Semantic information includes contextual relationships, for example, "pool in a backyard," "driveway to the garage," etc. Both the physical information as it exists in the image (a map of the labeled objects for instance) and the contextual relationships these objects may have in conjunction with their surroundings can be preserved in the database.

Other techniques are available for analyzing images and extracting features from images. See, for example, U.S. Pat. No. 9,082,162 describing methods for image searching using manual input, classification and/or segmentation. Such methods allow a user to select a portion of an image of an object, and additional searching focuses on the selected part.

Another example, PCT International Publication No. WO2016/054694 describes accessing geographical information system (GIS) data, including land-parcel data, to identify appropriate sites for potential property development. Geographical information system (GIS) data is accessed, including land-parcel data representing land-parcel coordinates that define land parcels. Other methods and systems are known to those skilled in the art for coordinating land parcel information with satellite and aircraft-based imagery data.

In step 16, objects and features in the selected real estate parcels are identified using the library of parceled real estate data. This data is analyzed to create a new classifier or model predictive of the user's desired features. In one embodiment, the user has selected multiple parcels having several features of interest. The objects and features (e.g., a pool, an arrangement of trees, style of a house, separate garage, or the like) in these multiple parcels are analyzed using machine learning algorithms to determine most likely common features and a predictive model is constructed in step 18 based on these identified features. The machine learning algorithms, often neural network or artificial intelligence based, develop correlations based on image spectral information, texture information, and other contextual details through the supply of representative data (e.g., example parcels with features of interest). These correlations are stored as a model that may then be applied to a broader area of interest, beyond the example parcel set.

Objects of interest may have multiple features. For example, an object may be cataloged by size, shape, color, spatial relation to another object, etc. While it is common for real estate listings to include the existence of a pool on a property, the presently described methods and systems distinguish pool characteristics such as tile color and distance from a lawn.

In one embodiment, algorithms comprising a neural network are utilized to determine patterns in the features and objects in the selected real estate parcels, and the predictive model is constructed therefrom. As mentioned above, the network establishes correlations across spectral, spatial, and contextual space for an object or feature of interest. A set of representative data that contains the objects/features of interest can be identified ('labeled') as truth data. A percentage of this truth data can be submitted to the network for training. Another percent can be reserved for testing the accuracy of the correlations identified (the 'model'). Training entails a statistical method to iterate the application of the correlations or model, 'learned' from the training data to the test data set. The accuracy of the prediction based on the known labels can be provided per iteration until a desired accuracy is achieved (nominally, >85%, but adjustable depending on the information provided) or timeframe is met. The final model post iteration may then be applied to a broader, unlabeled or unconstrained, region. During the training process, features and objects or interest may be weighted by the end-user based on personal significance or desire.

In one embodiment, deep learning neural networks classify the features and objects in the selected real estate parcels to construct the predictive model ('positive representations'). 'Negative representations', or representations that do not share the features of interest, may be predicted instead, based on what the user would elect to omit from desired properties. Such classification recognizes instances where the user has selected real estate parcels based on a lack of, rather than presence of, a specific feature.

Classic examples of a predictive model include a Support Vector Machine (svm) or k-means model. The artificial intelligence/neural network output is a similar type model, but with greater adaptability to both identify context and respond to changes in imagery parameters. It is typically a binary output, formatted and dictated by the language/format of network used that may then be implemented in a separate workflow and applied for predictive classification to the broader area of interest.

Once the predictive model is generated for a user, the user may be queried regarding a geographic area of interest. The user may identify and submit the geographic region of interest using methods known to those in the art. For example, the user can select or click an area from a map or a dropdown box, or identify a city and state, zip code, and the like. Once selected, the customized predictive model can be applied, on a parcel by parcel basis, to parcels in the selected geographic region to generate a customized output of identified or candidate real estate parcels as in steps 22 and 24.

Figure 4:
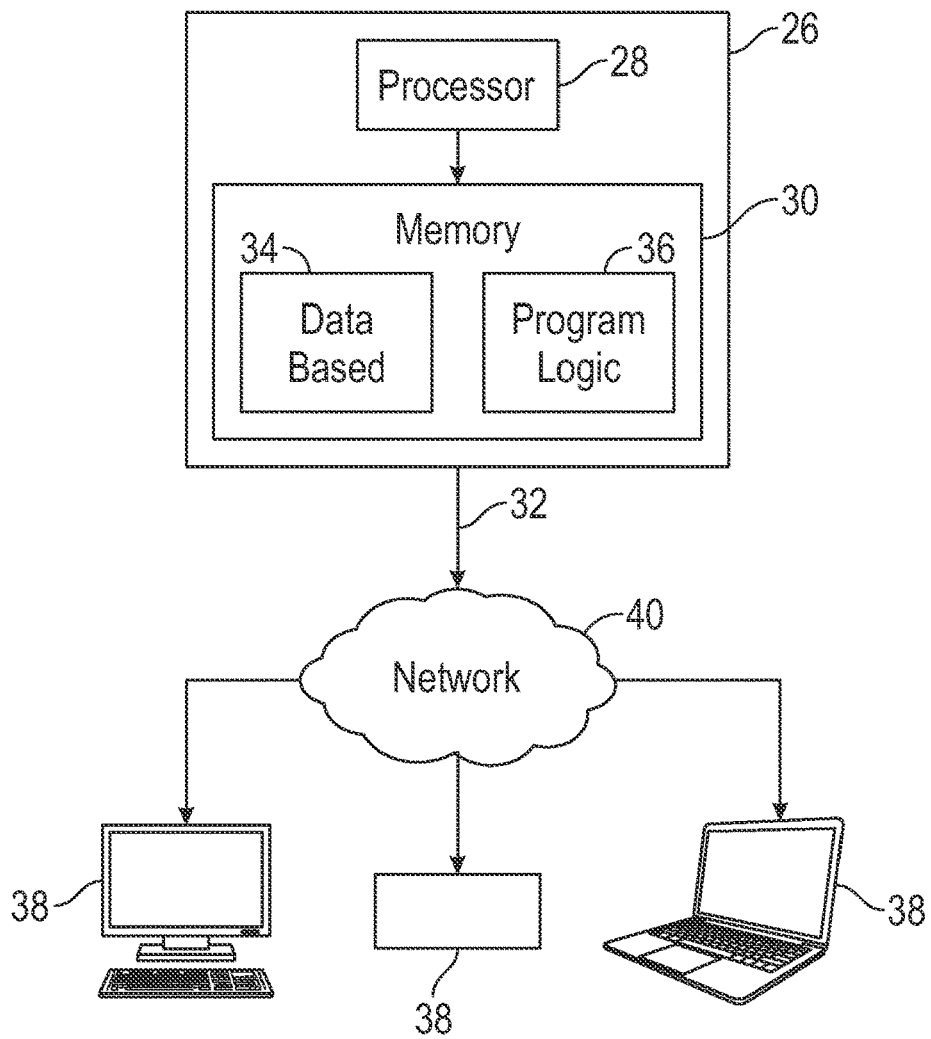
FIG. 4 illustrates an example system for locating candidate real estate parcels for a user in accordance with the present disclosure.

Referring now to FIG. 4, an example computing system 26 is shown for identifying real estate parcels predicted to have a feature of interest customized for a user. The system 26 includes a processor 28, memory 30, and a communication component 32. The memory 30 stores a database 34 and program logic 36. The computing system 26 bi-directionally communicates with a plurality of user devices 38 via a network 40.

Although FIG. 4 illustrates the system 26 as having a single processor 28, it should be noted that the system 26 may include multiple processors 28. The processor or multiple processors 28 may or may not necessarily be located in a single physical location.

Figure 5:
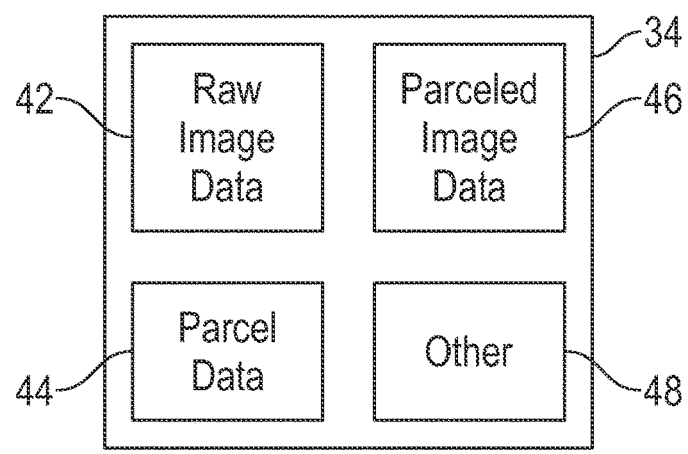
FIG. 5 illustrates an example database in the system of FIG. 4.

The database 34 is shown in more detail in FIG. 5 and includes raw image data 42, parcel data 44, parceled image data 46, and other data 48. The raw image data 42 can include, but is not limited to, street-view imagery, satellite imagery and/or aerial imagery. The parcel data 44 includes geographically divided portions of the land and may be provided by government agencies or public utilities, for example. The geographically divided portions can include country, state, county, township, and city or individual land owner borders. For purposes herein of identifying parcels having a feature of interest for a user, individual land owner borders or "real estate parcels" are utilized and included in the parcel data 44. Larger parcel data are useful for identifying regions of interest to the user.

The raw image data 42 and parcel data 44 are further processed by the program logic 36 to identify objects and features within each real estate parcel, the objects and features stored with the parceled image data 46. It is understood that "other" data 48 can be combined with the parceled image data. Non-limiting examples of other data 48 include weather, tax appraisals, legal status, and the like.

The program logic 36 can identify the objects and features within each real estate parcel using the techniques described above, as well as using artificial intelligence, such as neural network machine learning algorithms. In some embodiments, the program logic 36 is adapted to analyze the images and identify information with respect to objects on the real estate parcel, the style of the property, an arrangement or the relative size of objects on the property. The program logic 36 can also be configured to request from a user information indicative of the "feel" (love, hate, loathing, excitement, etc.) of the parcel and relate the feel to the identified objects and features within each real estate parcel.

In some embodiments, the program logic 36 is configured to analyze the images to determine a particular set of outdoor attributes of the real estate parcel, such as parcel square footage, ratios of lawn area, tree area, garden area, concrete area, building area, porch area, manmade area (e.g., a summation of building area and concrete area) home area and the like. Example ratios include a lawn area to tree area ratio, a lawn area to home area ratio, a lawn area to concrete area ratio, a lawn area to garden area ratio, a manmade area to parcel area, and a porch area to garden area ratio.

In one embodiment, a non-transitory computer-readable storage medium stores program logic 36, e.g., a set of instructions capable of being executed by one or more processor 28, that when executed by the one or more processor 28 causes the one or more processor 28 to (1) access a library of parceled real estate image data including object and feature identifications and classifications stored in the database 34, and identify and classify objects and features present in one or more real estate parcel(s) selected by a user as having a feature of interest; (2) use artificial neural network machine learning algorithms to develop a predictive model for identifying other real estate parcels having the user's feature of interest; and (3) apply the predictive model to a geographic region selected by the user to identify real estate parcels predicted to have the feature of interest.

In one embodiment, the network 40 is the Internet and the user devices 38 interface with the system 26 via the communication component 32 and a series of web pages. It should be noted, however, that the network 40 may be almost any type of network and may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

In one embodiment, the system 26 comprises a server system having multiple servers in a configuration suitable to provide a commercial computer based business system such as a commercial web-site and/or data center, In order to further illustrate the present invention, the following example is given. However, it is to be understood that the example is for illustrative purposes only and is not to be construed as limiting the scope of the invention.

Example

A potential home buyer uses a user device 38, e.g., a tablet, to access a web-based real estate service provider (system 26) offering the services described above. The user is moving to another state and would like to find a house with a lap pool with no trees adjacent to the pool.

Figure 6:
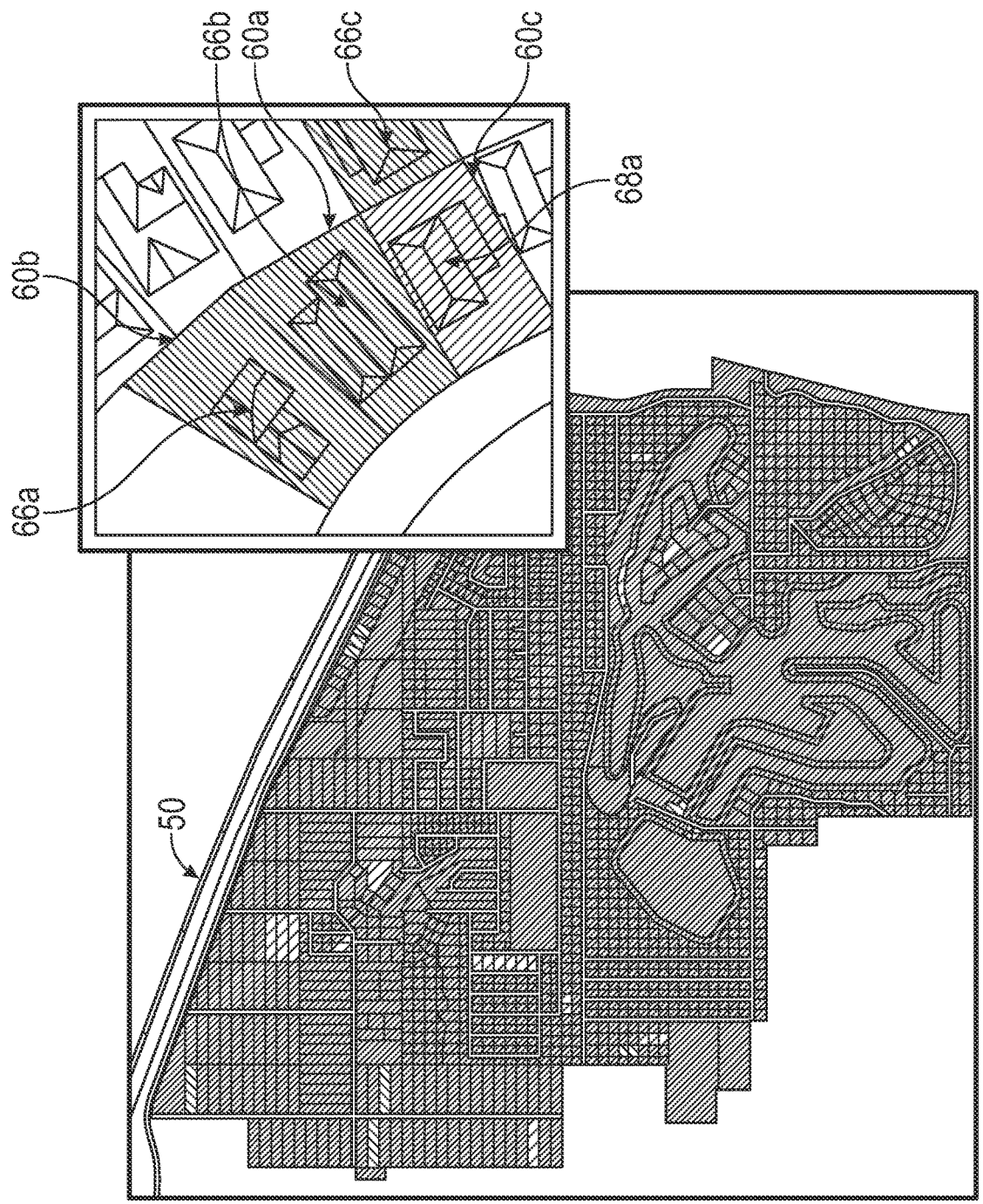
FIG. 6 is a partial view of a screen from a user's tablet showing user-identified parcels of interest in the Example.

Referring now to FIG. 6, the user requests a map 50 of the state (e.g., region of interest) from the system 26, which supplies data indicative of the map 50 to the tablet. In this example, the data indicative of the map may conform to the requirements of HTML. The tablet receives the data indicative of the map 50. The tablet renders the data onto a screen of the tablet, thereby displaying the map 50 of the state.

The user interacts with the tablet to cause the tablet to pan into an area the user is familiar with. This region of interest is shown with parcel boundaries 60a, 60b, and 60c overlaid onto the map 50 and the user either knows of, or views online, images of a number of the properties in this region. All of the parcel boundaries 60 have not been specifically identified in FIG. 6 or FIG. 7 for purposes of clarity.

The user interactively selects or uploads the addresses for those real estate parcels having a lap pool and no nearby trees and identifies such real estate parcels as positive examples 66a, 66b, and 66c. Real estate parcels 68 that the user knows do not have a lap pool or have trees next to the lap pool are identified as negative by the user and are designated with the reference numerals 68, for example.

The real estate service provider obtains the imagery for each of the positive examples 66 and negative examples 68 and this information is ingested into a backend neural network and machine learning algorithms for training the system 26 to identify positive and negative correlations among these real estate parcels. These correlations result in a predictive model that is used to predict the existence of the desired feature (lap pool without adjacent trees) over a different imagery set, namely the city and state to which the user will be moving.

The user selects the new region of interest. While the new region of interest is shown as the same region in FIG. 7, it could also be within the original specified region or could include other states, cities, countries, etc.

Figure 7:
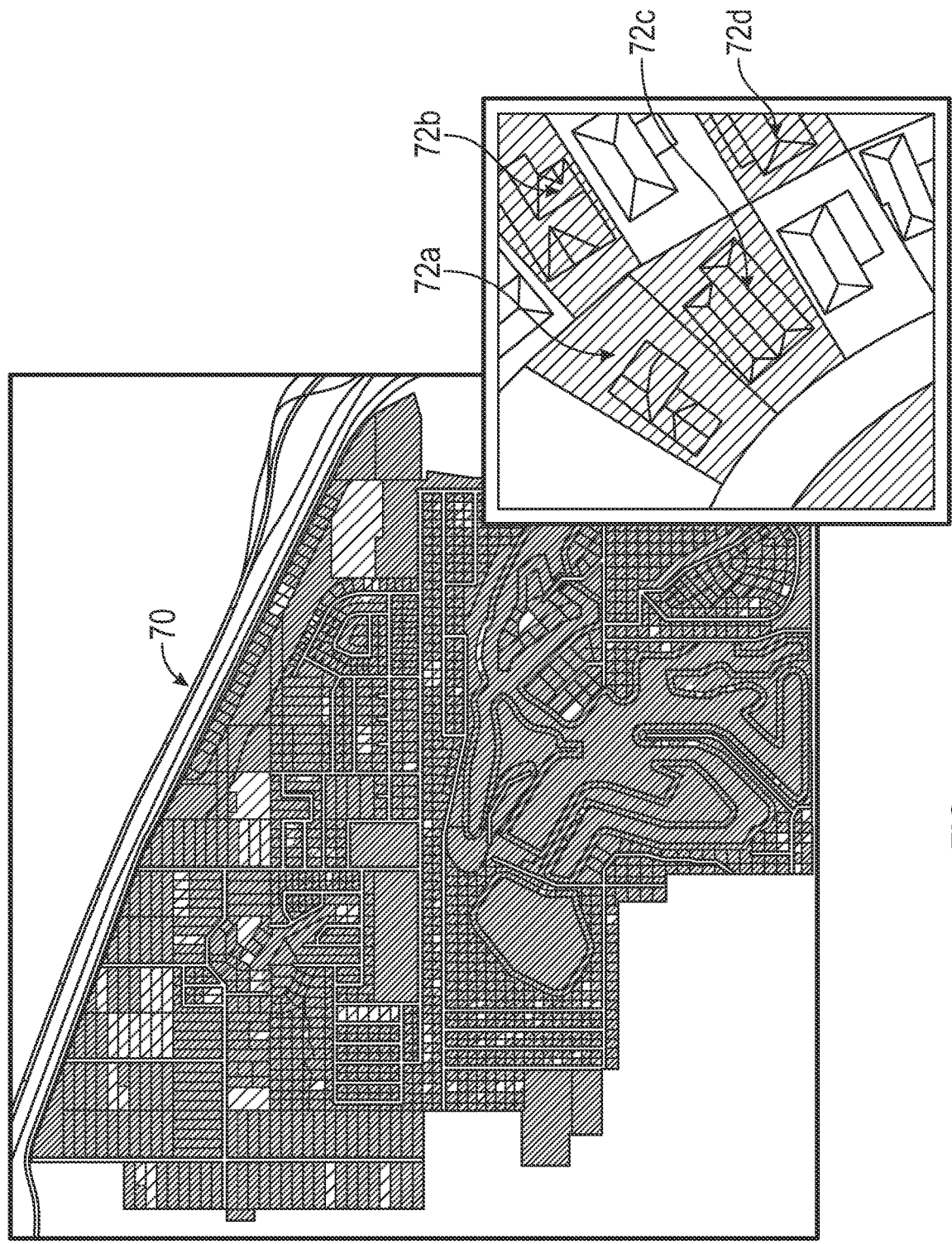
FIG. 7 shows the model output to the user's tablet in the Example.

The final product shown in FIG. 7 is map 70 that shows a predictive application of this predictive model in which candidate real estate parcels 72 are identified that are expected to have the desired feature with confidence and metrics based on the prediction. Exemplary candidate real estate parcels 72a, 72b, 72c, and 72d are designated by way of example. The candidate real estate parcels 72a, 72b, 72c, and 72d can be identified, by way of example, by highlighting the parcels The results can be displayed on the screen of the tablet as the map 70 or as a list of addresses (not shown).

From the above description and examples, it is clear that the inventive concepts disclosed and claimed herein are well adapted to attain the advantages mentioned herein. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. A system, comprising:
a non-transitory computer-readable storage medium storing instructions that, when executed by one or more processors, cause the one or more processors to:
receive from a user a selection of first images of first real estate parcels in a first geographic region the first images having pixels, the first images identified by the user as having one or more features or characteristics of interest to the user;
construct a predictive model by analyzing the first real estate image data, including at least the first imagery, corresponding to the parcel selection for the one or more features of interest to the user to determine commonalities of the multiple real estate parcels of the parcel selection, the predictive model comprising machine learning algorithms used in one or more neural networks that develop and store correlations for the first imagery based on one or more of: image spectral information, image texture information, and image contextual details; and
apply the predictive model to second images of second real estate parcels in a second geographic region, the second geographic region selected by the user, the second geographic region different from the first geographic region, to identify particular second real estate parcels in the second geographic region predicted to have the one or more features or characteristics of interest, the predictive model created by utilizing artificial neural network machine learning algorithms to:
analyze the first images of the first real estate parcels in the first geographic region on a real estate parcel-by-parcel basis, by identifying and classifying features or characteristics within the one or more of the first images; and
develop correlations for the first images of the first real estate parcels, based on one or more of: image spectral information, image texture information, and image contextual details.

2. The system of claim 1, wherein the instructions, when executed by the one or more processors, cause the one or more processors to:
output to the user the identified particular second real estate parcels in the second geographic region predicted to have the one or more features or characteristics of interest.

3. The system of claim 2, wherein the output is displayed as a map.

4. The system of claim 2, wherein the output is displayed as a list of addresses.

5. The system of claim 2, wherein the output comprises one or more of the second images.

6. The system of claim 1, wherein one or more of the first images and the second images comprise aerial images.

7. The system of claim 1, wherein the second geographic region is selected by the user from a map.

8. The system of claim 1, wherein the first images are selected by the user from a map.

9. The system of claim 1, wherein one or more of the first images and the second images comprise satellite images.

10. The system of claim 1, wherein one or more of the first images are captured from a street view orientation.

11. A method, comprising:
receiving, with one or more processors, from a user a selection of first images of first real estate parcels in a first geographic region, the first images having pixels, the first images identified by the user as having one or more features or characteristics of interest to the user;
constructing, with the one or more computer processors, a predictive model by analyzing the first real estate image data, including at least the first imagery,
corresponding to the parcel selection for the one or more features of interest to the user to determine commonalities of the multiple real estate parcels of the parcel selection,
the predictive model comprising machine learning algorithms used in one or more neural networks that develop and store correlations for the first imagery based on one or more of: image spectral information, image texture information, and image contextual details;
applying, with the one or more processors, the predictive model to second images of second real estate parcels in a second geographic region, the second geographic region selected by the user, the second geographic region different from the first geographic region, to identify particular second real estate parcels in the second geographic region predicted to have the one or more features or characteristics of interest, the predictive model created by the one or more processors by utilizing artificial neural network machine learning algorithms to:
analyze the first images of the first real estate parcels in the first geographic region on a real estate parcel-by-parcel basis, by identifying and classifying features or characteristics within the one or more of the first images; and
developing develop correlations for the first images of the first real estate parcels, based on one or more of: image spectral information, image texture information, and image contextual details.

12. The method of claim 11, comprising:
outputting, with the one or more processors, to the user, the identified particular second real estate parcels in the second geographic region predicted to have the one or more features or characteristics of interest.

13. The method of claim 12, wherein outputting comprises displaying the identified particular second real estate parcels in the second geographic region predicted to have the one or more features or characteristics of interest as a map.

14. The method of claim 12, wherein outputting comprises displaying the identified particular second real estate parcels in the second geographic region predicted to have the one or more features or characteristics of interest as a list of addresses.

15. The method of claim 12, wherein the outputting the identified particular second real estate parcels in the second geographic region predicted to have the one or more features or characteristics of interest comprises displaying one or more of the second images.

16. The method of claim 11, wherein one or more of the first images and the second images comprise aerial images.

17. The method of claim 11, wherein one or more of the first images and the second images comprise satellite images.

18. The method of claim 11, wherein the second geographic region is selected by the user from a map.

19. The method of claim 11, wherein one or more of the first images are captured from a street view orientation.

20. A system, comprising:
a non-transitory computer-readable storage medium storing instructions that, when executed by one or more processors, cause the one or more processors to:
receive from a user a selection of first images of first real estate parcels in a first geographic region, the first images having pixels, the first images identified by the user as having one or more features or characteristics of interest to the user; and
construct a predictive model by analyzing the first real estate image data, including at least the first imagery, corresponding to the parcel selection for the one or more features of interest to the user to determine commonalities of the multiple real estate parcels of the parcel selection, the predictive model comprising machine learning algorithms used in one or more neural networks that develop and store correlations for the first imagery based on one or more of: image spectral information, image texture information, and image contextual details;
apply the predictive model to second images of second real estate parcels in a second geographic region, the second geographic region selected by the user, the second geographic region different from the first geographic region, to identify particular second real estate parcels in the second geographic region predicted to not have the one or more features or characteristics of interest, the predictive model created by utilizing artificial neural network machine learning algorithms to:
analyze the first images of the first real estate parcels in the first geographic region on a real estate parcel-by-parcel basis, by identifying and classifying features or characteristics within the one or more of the first images; and
develop correlations for the first images of the first real estate parcels, based on one or more of: image spectral information, image texture information, and image contextual details.

* * * * *